March 18, 1930. W. O. MIESSNER 1,751,048
VIOLIN PRACTICE FINGER BOARD
Filed Oct. 25, 1928
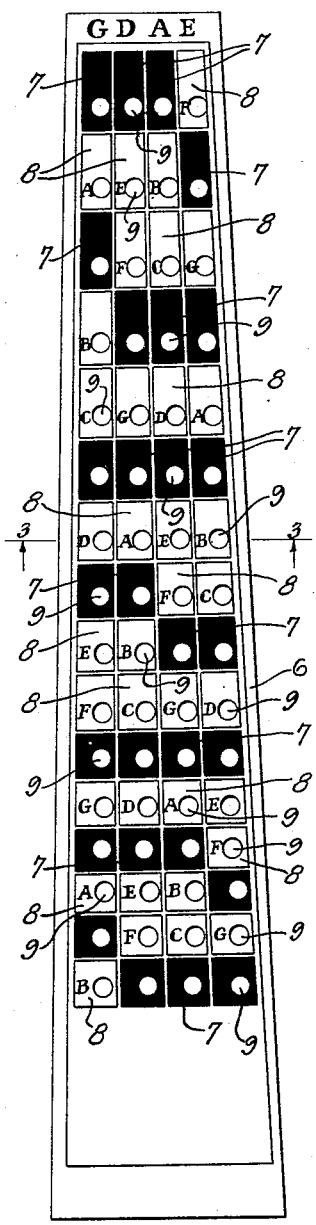
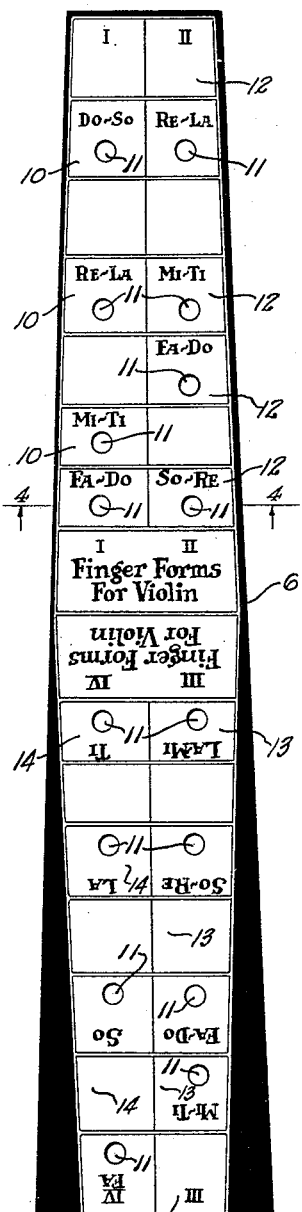
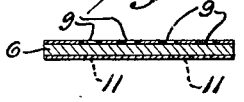
INVENTOR.
William Otto Miessner,
BY Morsell, Keeney & Morsell
ATTORNEYS Patented Mar. 18, 1930

1,751,048

UNITED STATES PATENT OFFICE

WILLIAM OTTO MIESSNER, OF MILWAUKEE, WISCONSIN

VIOLIN PRACTICE FINGER BOARD

Application filed October 25, 1928. Serial No. 314,905.

This invention relates to improvements in violin practice finger-board.

It is the primary object of the present invention to provide a practice finger-board for use by persons learning to play the violin, arranged so as to materially aid the pupil in quickly and accurately finding the proper finger positions.

A further object of the invention is to provide a practice finger-board divided to correspond with the finger positions of a violin finger-board with the divisions being provided with recesses to aid the user in the proper placing and positioning of his fingers.

A further object of the invention is to provide a violin practice finger-board which is divided in accordance with the finger positions of a violin finger-board with the divisions colored either white or black, the divisions colored white representing natural tones, while the black divisions represent sharped and flatted tones, corresponding with the white and black keys of a piano.

A further object of the invention is to provide a practice finger-board of the class described having two usable sides or surfaces, one side being arranged or divided to give all of the finger positions used in playing a violin, while the other side of the finger-board is arranged and divided to give the four finger forms used in playing a violin.

A further object of the invention is to provide a finger-board of the class described which is very simple and inexpensive to manufacture, is helpful and of great advantage to a pupil, and is well adapted for the purposes described.

With the above and other objects in view the invention consists of the improved practice finger-board, and its parts and combinations, as set forth in the claims, and all equivalents thereof.

In the accompanying drawing in which the same reference characters indicate the same parts in all of the views:

Fig. 1 is a plan view of one side of the improved practice finger-board;

Fig. 2 is a plan view of the opposite side thereof;

Fig. 3 is a cross-sectional view taken on line 3—3 of Fig. 1; and

Fig. 4 is a cross-sectional view taken on line 4—4 of Fig. 2.

Referring now more particularly to the drawing, it will appear that the practice finger-board is in the form of an elongated board or strip 6 of any suitable material and slightly narrower at one end than at the other.

One surface of the board is formed or lined into longitudinal and transverse rows of rectangles, shown in Fig. 1, said rectangles being elongated toward the narrower end of the board and becoming more square toward the wider end of the board. In each longitudinal row there are sixteen rectangles, while in each transverse row there are four rectangles. The longitudinal rows of rectangles are designated respectively, reading from left to right in Fig. 1, "G", "D", "A", and "E" to correspond with the "G", "D", "A", and "E" strings of a violin. Some of the rectangles are colored black, as indicated by the numeral 7, while the other rectangles 8 are white. The black rectangles correspond with the black keys of a piano and represent sharped and flatted tones, while the white rectangles also correspond with the white keys of a piano and represent natural tones.

The white rectangles in the "G" row in Fig. 1 are designated respectively "A", "B", "C", "D", "E", "F", "G", "A" and "B" and indicate the finger positions for the corresponding tones on the first or "G" string of a violin. The black rectangles in said row, of course, represent the sharped or flatted tones of the tones represented by the white rectangles they are between.

The white rectangles in the "D" row in Fig. 1 are designated respectively "E", "F", "G", "A", "B", "C", "D", "E" and "F" and the black rectangles indicate corresponding sharped and flatted tones.

In the "A" row the white rectangles bear the designations "B", "C", "D", "E", "F", "G", "A", "B" and "C" and the black rectangles indicate positions for corresponding respective sharped and flatted tones.

In the last, or "E" row the respective designations of the white rectangles are "F", "G", "A", "B", "C", "D", "E", "F" and "G". Finger positions for corresponding sharped or flatted tones are indicated by the black rectangles.

In order to assist the pupil in locating the correct finger position in each rectangle, each rectangle is provided with a circular recess 9. In practice, said recesses may be readily felt by the fingers.

The reverse side of the practice finger-board is shown in Fig. 2 and is divided into four finger forms. The first finger form marked "I" should be mastered first and comprises seven squares or rectangles 10 extending in a longitudinal row from the upper end of the board to a medial portion thereof. In this row, the second, fourth, sixth and seventh squares are marked respectively "Do-So", "Re-La", "Mi-Ti" and "Fa-Do" and on the "D" string of a violin the fingers so placed produce the first list of tones, and the second noted tones are similarly produced on the violin "A" string. The squares or rectangles specifically mentioned are formed with recesses 11 so that the fingers may locate the same.

Adjacent the finger form row "I" there is a finger form "II" of an equal number of similarly arranged squares or rectangles 12 of which the second, fourth, fifth and seventh squares are marked respectively "Re-La", "Mi-Ti", "La-Do" and "So-Re" and are formed with locating recesses 11. The finger positions indicated on form "II" will on the "G", "D" and "A" strings of a violin produce the following tones: re, mi, fa and so, while on the violin "D", "A" and "E" strings the tones produced by these positions will in order be la, ti, do, and re.

The finger form designated "III" extends from the bottom of the board toward the medial portion thereof and comprises seven squares or rectangles 13 of which, reading from the end inwardly, the second, third, fifth and seventh are marked respectively "Mi-Ti", "Fa-Do", "So-Re" and "La-Mi" and said squares are provided with finger locating recesses 11. In this form the half step lies between the first and second finger positions.

A finger form designated "IV" is located adjacent the finger form last referred to and is formed of seven squares or rectangles 14 extending inwardly of which the first, third, fifth and seventh are marked respectively "Fa", "So", "La" and "Ti" and have finger locating recesses 11. This arrangement will occur only once in any key and there are no half steps but the fingers will be positioned a whole step apart.

The improved practice finger-board enables the pupil to familiarize himself with the correct finger positions on a violin. The pupil should first master the finger positions on form "I" and then subsequently learn in order the positions in form "II", "III" and "IV", after which the entire finger-board, on the side shown in Fig. 1, may be used. Obviously practice on the finger-board will acquaint the pupil with correct finger positions and when he takes up an actual violin he will be able to readily position his fingers on the strings thereof so as to produce desired tones.

From the foregoing description it will be seen that the improved violin practice finger-board is of very simple and novel construction, and is well adapted for the purposes described.

What I claim as my invention is:

1. As a new article of manufacture, a board having delineated thereon in adjacent longitudinal rows a plurality of divisions, said divisions indicating the finger positions for successive tones or half tones on a string of a stringed instrument, each division being provided with a finger locating recess.

2. As a new article of manufacture, a board having delineated thereon in adjacent longitudinal rows a plurality of divisions, said divisions indicating the finger positions for successive natural tones or intermediate half tones on a string of a stringed instrument, the divisions representing notes of the diatonic major scale being marked to distinguish the same from the divisions representing other notes of the chromatic scale, and the first-mentioned divisions having musical note indicia thereon.

3. As a new article of manufacture, a board having delineated thereon a plurality of stringed instrument finger forms, each form being marked to designate finger positions for a single string of a musical instrument and the finger positions of each form differing from that of the other forms.

4. As a new article of manufacture, a board having delineated thereon a plurality of stringed instrument finger forms, each form being marked and formed with recesses to designate finger positions for a single string of a musical instrument and the finger positions of each form differing from that of the other forms.

5. As a new article of manufacture, a board having delineated on one surface thereof four sets of stringed instrument finger forms, each finger form being arranged in a longitudinal row and a pair of said forms extending from one end of the board toward a medial portion thereof and the other pair of said forms extending from the other end of the board toward a medial portion thereof, each form being marked and provided with recesses to designate finger positions and the finger positions of each form differing from that of the other forms.

6. As a new article of manufacture, a board having delineated on one surface thereof four longitudinal rows of divisions, said longitudinal rows corresponding to the string arrangement on the finger board of a stringed instrument, the divisions of each row indicating the finger positions for successive natural tones or intermediate tones on a string represented thereby, the divisions representing notes of the diatonic major scale being marked to distinguish the same from the divisions marked to represent other notes of the chromatic scale, and the first-mentioned divisions having musical note indicia thereon, each division being provided with a finger locating recess, said board having delineated on the other surface thereof four sets of stringed instrument finger forms, each finger form being arranged in a longitudinal row and a pair of said forms extending from one end of the board toward a medial portion thereof and the other pair of said forms extending from the other end of the board toward a medial portion thereof, each form being marked and provided with recesses to designate finger positions and the finger positions of each form differing from that of the other forms.

In testimony whereof, I affix my signature.

WILLIAM OTTO MIESSNER.